(12) United States Patent
Yamashita et al.

(10) Patent No.: US 9,167,635 B2
(45) Date of Patent: Oct. 20, 2015

(54) LIGHT EMITTING APPARATUS, DRIVING CIRCUIT OF LIGHT EMITTING ELEMENT, AND DRIVING METHOD

(71) Applicant: CANON KABUSHIKI KAISHA, Tokyo (JP)

(72) Inventors: Takanori Yamashita, Hachioji (JP); Masami Iseki, Mobara (JP); Tsuyoshi Yabukane, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 14/030,710

(22) Filed: Sep. 18, 2013

(65) Prior Publication Data

US 2014/0078233 A1 Mar. 20, 2014

(30) Foreign Application Priority Data

Sep. 20, 2012 (JP) ................................. 2012-206884

(51) Int. Cl.
*G09G 3/30* (2006.01)
*H05B 33/08* (2006.01)
*G03G 15/04* (2006.01)
*B41J 2/385* (2006.01)
*B41J 2/45* (2006.01)
*G09G 3/32* (2006.01)

(52) U.S. Cl.
CPC .............. *H05B 33/08* (2013.01); *B41J 2/385* (2013.01); *B41J 2/45* (2013.01); *G03G 15/04036* (2013.01); *G09G 3/3208* (2013.01)

(58) Field of Classification Search
CPC .................... G09G 3/3241; G09G 2300/0819; G09G 2320/0271; G09G 2300/0861; G09G 2310/0251; G09G 2300/0852; G09G 3/22; G09G 3/30
USPC ...................................................... 345/76, 87
See application file for complete search history.

(56) References Cited

U.S. PATENT DOCUMENTS

| 9,030,105 | B2 * | 5/2015 | Koyama ...................... 315/169.1 |
| 2005/0057459 | A1 * | 3/2005 | Miyazawa ........................ 345/76 |
| 2006/0221005 | A1 * | 10/2006 | Omata et al. .................... 345/76 |
| 2007/0236424 | A1 * | 10/2007 | Kimura ........................... 345/76 |

FOREIGN PATENT DOCUMENTS

JP 2006-308845 A1 11/2006

* cited by examiner

*Primary Examiner* — Pegeman Karimi
(74) *Attorney, Agent, or Firm* — Canon USA, Inc. IP Division

(57) ABSTRACT

A light emitting apparatus includes a light emitting element, a driving circuit which has a driving transistor having a gate, a drain, and a source, and a capacitor having one end connected to the gate, a power line, and first and second voltage lines, and, in a period in which the gate and the drain are short-circuited and the drain and the light emitting element are blocked, the source is connected to the first voltage line and the other end of the capacitor is connected to the second voltage line to hold a voltage in the capacitor, and, in a period in which the gate and the drain are disconnected and the drain and the light emitting element are connected, the source is connected to the power line, and the other end of the capacitor is connected to the source to supply a current to the light emitting element.

17 Claims, 11 Drawing Sheets

LIGHT EMITTING APPARATUS, DRIVING CIRCUIT OF LIGHT EMITTING ELEMENT, AND DRIVING METHOD

BACKGROUND OF THE INVENTION

1. Field of the Invention

One disclosed aspect of the embodiments relates to a light emitting apparatus and a driving circuit of a light emitting element and, more particularly, relates to a light emitting apparatus which uses organic electroluminescence device (referred to as an "organic EL element" below) as light emitting elements.

2. Description of the Related Art

An organic EL element is a light emitting element which is formed by sandwiching an organic compound layer between two electrodes, and emits light at brightness matching a current flowing between the electrodes. An application of a light emitting apparatus which uses organic EL elements is a display apparatus in which organic EL elements are arranged in a matrix on a plane. Other applications are an exposure apparatus of an electrophotographic printer in which organic EL elements are provided in a one-dimensional array and a lighting apparatus which emits light of a wide area.

Since a large current flows in an organic EL element upon light emission and a resistance of a conductive line from a power source to a driving circuit of the organic EL element (referred to as a "power line" below) is usually high, a voltage significantly drops along the power line and a voltage applied to the organic EL elements decreases. In a light emitting apparatus in which multiple driving circuits of the organic EL elements are arranged along a power line, the voltage drop results in a difference of a power voltage between an organic EL element close to a power source and an organic EL element far from the power source. This power voltage gradation occurs not only in the power line of an anode side but in a power line of a cathode side of the organic EL element.

Meanwhile, a voltage signal which determines light emission luminance is applied to the driving circuit of the organic EL element through a data line. A current only transiently flows in the data line, and therefore the voltage drops along the data line very little compared to the power line. Hence, the voltage signal is written in the driving circuits irrespectively of the voltage gradation along the power line.

The driving circuit generates a current according to the written signal voltage, and supplies the current to the organic EL element. The current is generated in the driving circuit based on the signal voltage relative to the power voltage. Therefore, even though a signal voltage is uniform, the currents generated in the driving circuits are not uniform due to the gradation of the power voltage.

Japanese Patent Application Laid-Open No. 2006-308845 discloses an embodiment of a driving circuit which first disconnects both ends of a capacitor for holding a signal from the driving circuit, applies a fixed voltage to one end, applies a signal voltage to the other end, and finally connects the capacitor to the driving circuit while maintaining the voltage between both ends of the capacitor. Thus, a current irrespective of the power voltage is generated.

In another embodiment of the patent application, two capacitors are disposed in the driving circuit and a signal voltage is written in a capacitor and a threshold voltage of a driving transistor is held in another capacitor. By connecting the capacitors to the driving circuit, a sum of the signal voltage and the threshold voltage is applied to the driving transistor to generate a current irrespectively of the threshold voltage.

A conventional driving circuit requires two capacitors to cancel variation of the threshold voltage of the driving transistor and cancel influence of variation of the power voltage. Since capacitors occupy a large portion of a pixel area, it is difficult to reduce a pixel size and improve precision of the display.

SUMMARY OF THE INVENTION

One disclosed aspect of the embodiments is to suppress variation of the driving current caused by the power source voltage variation without increasing the number of capacitors in a driving circuit.

A first aspect is a light emitting apparatus comprising:
a light emitting element;
a driving circuit including a driving transistor, a first switch provided between a gate and a drain of the driving transistor, a second switch provided between the drain of the driving transistor and one end of the light emitting element and a capacitor one end of which is connected to the gate of the driving transistor;
a power line configured to supply a power source voltage to the driving circuit, and
a first voltage line and a second voltage line configured to supply a first voltage and a second voltage, respectively, to the driving circuit, wherein
the driving circuit includes a third switch which connects a source of the driving transistor to the power line and the first voltage line alternately, and a fourth switch which connects the other end of the capacitor to the source of the driving transistor and the second voltage line alternately, and
the first to fourth switches are controlled such that,
in a first period in which the first switch is on and the second switch is off, the third switch connects the source of the driving transistor to the first voltage line and the fourth switch connects the other end of the capacitor to the second voltage line, and
in a second period in which the first switch is off and the second switch is on, the third switch connects the source of the driving transistor to the power line and the fourth switch connects the other end of the capacitor to the source of the driving transistor.

A second aspect is
a plurality of driving circuits aligned along a common power line and individually supplying a current to a light emitting element, each of the driving circuits comprising:
a driving transistor;
a capacitor one end of which is connected to a gate of the driving transistor;
a first switch connecting the gate of the driving transistor to a drain of the driving transistor;
a second switch connecting the drain of the driving transistor to the light emitting element;
a third switch connecting a source of the driving transistor to the power line and a first voltage line alternately;
a fourth switch connecting the other end of the capacitor to the source of the driving transistor and the second voltage line alternately; and
at least one control line configured to control the first to fourth switches.

A third aspect is a method of driving a light emitting element using a driving circuit connected to a power line, a first voltage line, and a second voltage line, wherein
the driving circuit includes: a driving transistor; a capacitor one end of which is connected to a gate of the driving transistor; a first switch connecting the gate of the driving transistor to a drain of the driving transistor; a second switch connecting the drain of the driving transistor to the light emitting element; a third switch connecting a source of the driving transistor to the power line and the first voltage line alternately; and a fourth switch connecting the other end of the capacitor to the source of the driving transistor and the second voltage line alternately, the method comprising:

turning on the first switch, turning off the second switch, connecting the source of the driving transistor to the first voltage line by means of the third switch and connecting the other end of the capacitor to the second voltage line by means of the fourth switch; and turning off the first switch, turning on the second switch, connecting the source of the driving transistor to the power line by means of the third switch and connecting the other end of the capacitor to the source of the driving transistor by means of the fourth switch.

An embodiment may suppress variation of luminance caused by fluctuation of a power voltage.

Further features of the disclosure will become apparent from the following description of exemplary embodiments with reference to the attached drawings.

DESCRIPTION OF THE EMBODIMENTS

While disconnecting one terminal of a capacitor of a driving circuit and a source terminal of a driving transistor from the driving circuit, a fixed voltage and a signal voltage are applied to these terminals to hold both of a threshold voltage and a signal voltage in the capacitor. By reconnecting these terminals to the driving circuit, a current irrespective of the threshold voltage and the power voltage is generated.

Embodiments of a light emitting apparatus will be described below using drawings. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

Figure 1:
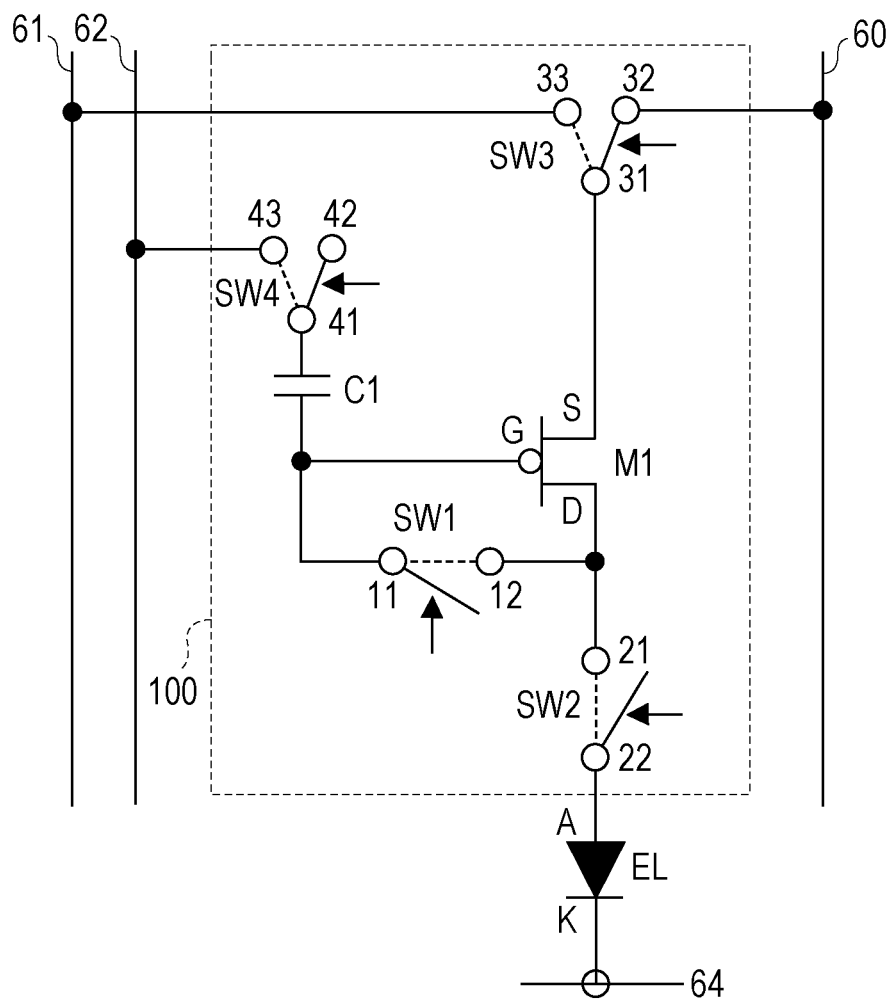
FIG. 1 is a circuit diagram illustrating a configuration of a driving circuit of a light emitting apparatus.

FIG. 1 is a view illustrating the driving circuit of a light emitting apparatus.

A driving circuit 100 has a driving transistor M1, a charging element or capacitor C1, and first to fourth switches SW1, SW2, SW3, and SW4.

The driving transistor M1 is a P channel type MOS transistor. A source S of the driving transistor M1 is connected to one terminal 31 of a third switch SW3 and a second terminal 42 of a fourth switch SW4. A gate G is connected to one terminal of the capacitor C1 and is simultaneously connected to a terminal 11 of a first switch SW1. A drain D is connected to another terminal 12 of the first switch SW1 and one terminal 21 of the second switch.

One end of the capacitor C1 is connected to a gate of the driving transistor M1, and the other end is connected to a first terminal 41 of the fourth switch SW4.

An anode of the organic EL element EL is connected to the second terminal 22 of the second switch SW2, and a cathode is connected to a ground line 64.

The first switch SW1 and the second switch SW2 are two-terminal switches which switch on and off. The third and fourth switches are both three-terminal switches, and enter one of a state in which the first terminal and the second terminal are connected and the first and third terminals are disconnected, and a state in which the first terminal and the second terminal are disconnected and the first and third terminals are connected. The first to fourth switches are connected with control lines which are not illustrated, and connection states are controlled according to a control signal which takes a binary value of H (high) and L (low).

In the driving circuit 100, a power line 60, a first voltage line 61, a second voltage line 62 and a ground line 64 are arranged. The power line 60 applies a power voltage Voled to the second terminal 32 of the third switch SW3. The first voltage line 61 applies a voltage V1 to the third terminal 33 of the third switch SW3, and the second voltage line 62 applies a voltage V2 to the third terminal 43 of the fourth switch SW4. The ground line 64 applies a common potential Vcom to the cathode of the organic EL element EL.

A signal voltage which determines light emission luminance of the organic EL element is written in the driving circuit as a difference between the voltage V1 of the first voltage 61 and the voltage V2 of the second voltage line 62.

The driving circuit 100 extracts a current according to a gate-source voltage from the power line when the source S of the driving transistor M1 is connected to the power line 60 through the third switch SW3. A drain current is supplied to the organic EL element EL when the second switch SW2 is on, and flows between an anode A and a cathode K. The organic EL element EL emits light at luminance matching this current.

Figure 2:
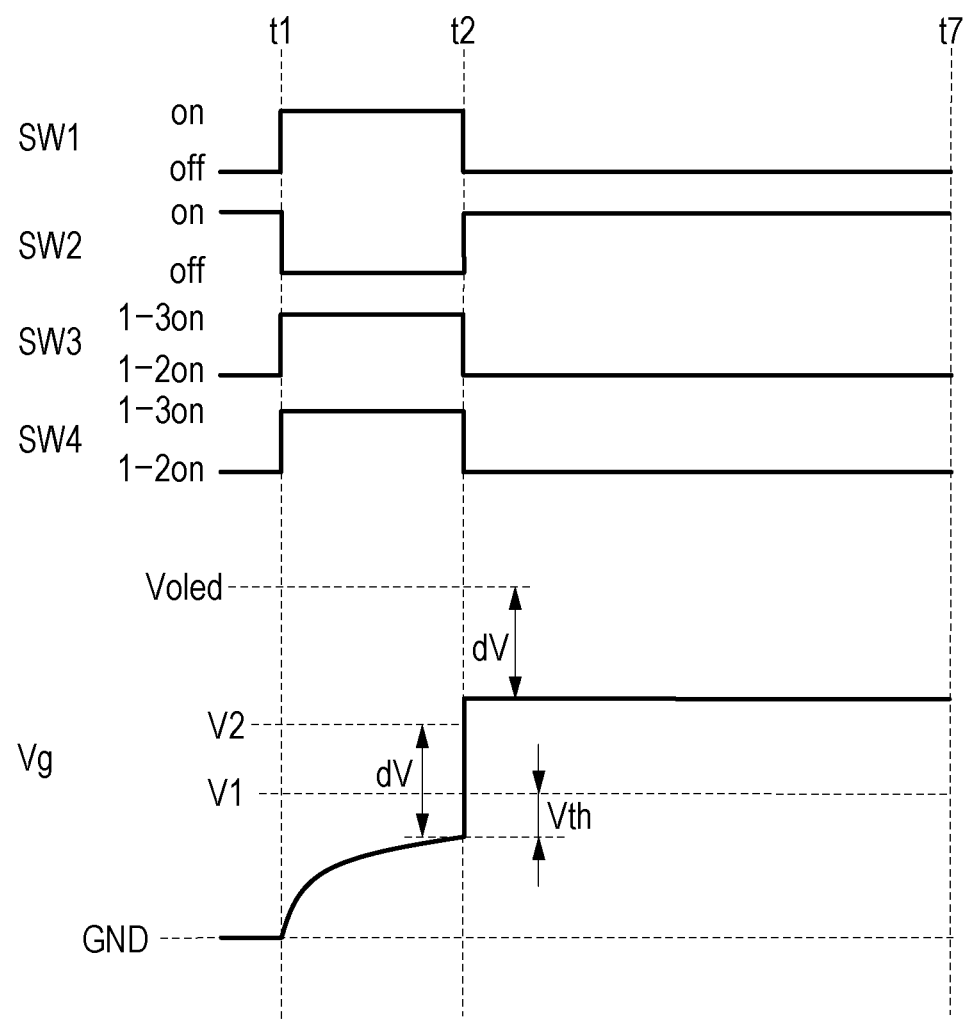
FIG. 2 is a timing chart of a driving apparatus.

The first to fourth switches SW1 to SW4 are applied control signals as indicated by arrows in FIG. 2, and connection states thereof may be switched.

FIG. 2 is a timing chart illustrating connection process of the first to fourth switches SW1 to SW4, and the gate voltage Vg of the driving transistor.

A time interval between t1 and t2 is a period in which the voltage is written in the capacitor C1, and the first switch SW1 is turned on, the second switch SW2 is turned off, the third switch SW3 is turned on the third terminal side, that is, the first terminal and the third terminal are connected, and the first and the second terminal are turned off. The fourth switch SW4 is also in an on state on the third terminal side. (In FIG. 2, this state is indicated as 1-3on, and an opposite state is indicated as 1-2on.) The source S of the driving transistor M1 is connected to the first voltage line 61, and receives a supply of the first voltage V1. A terminal of the capacitor C1 on an opposite side of the gate G of the driving transistor is connected to the second voltage line 62, and receives the second voltage V2.

The voltage of the gate G of the driving transistor M1 in this period is indicated as Vg in FIG. 2. A current (drain current) supplied from the first voltage line 61 and flowing between the source and the drain of the driving transistor M1 passes the first switch SW1 and flows into the capacitor C1. This current raises the voltage (that is, the gate voltage Vg) of the terminal of the capacitor C1 which is connected to the gate of the driving transistor M1. A rise in the gate voltage Vg decreases a voltage between the gate and the source of the driving transistor M1, and, when the voltage becomes close to the threshold voltage Vth of the driving transistor M1, the drain current then also becomes small. In a sufficiently long time, the voltage of the gate G of the driving transistor M1 becomes V1−Vth, and both end voltage dV of the capacitor C1 is V2−V1+Vth with a gate side as a negative side.

The voltage held in the capacitor C1 at a time t2 includes the threshold voltage Vth of the driving transistor. This is a result of an operation of charging the capacitor C1 by means of a current flowing in the driving transistor M1. This operation enables only one capacitor C1 to hold a signal voltage (V2−V1) which specifies luminance and the threshold voltage Vth of the driving transistor.

After the time t2, the first switch SW1 is turned off, the second switch SW2 is turned on, the third switch SW3 is turned on the second terminal side, and the fourth switch SW4 is turned on the second terminal side. The source S of the driving transistor M1 is connected to the power line 60, and the terminal of the capacitor C1 on an opposite side of the gate of the driving transistor is connected to the source S of the driving transistor. As a result, the source S of the driving transistor M1 is the power voltage Voled, and a voltage dV=V2−V1+Vth held in the capacitor C1 is applied between the gate and source of the driving transistor M1. This voltage is a voltage with a source side as a positive side and a gate side as a negative side, and, in a P channel type MOS transistor, by setting V2>V1, the driving transistor M1 is turned on and a drain current determined by V2−V1 flows. In this case, the current generated by the driving circuit 100 depends on neither the power voltage Voled nor the threshold voltage Vth.

The drain current is determined by V2−V1 when an anode voltage of an organic EL element, that is, a drain voltage of the driving transistor M1 is lower than a gate voltage, in other words, the driving transistor M1 operates in a saturated region. This is guaranteed by setting sufficiently high Voled.

If there is no third switch SW3 and the source of the driving transistor M1 is connected to the power line 60 at all times, the both-end voltage of the capacitor C1 at the time t2 is V2−Voled+Vth and the drain current subsequent to t2 depends on the voltage Voled of the power line 60. The power line 60 is a conductive line which is led from the original power source which generates a power voltage and is laid in the driving circuit 100 and has a resistance, and the voltage applied to the driving circuit 100 takes a value which differs depending on a current flowing in the power line. When a power line reaching the driving circuit 100 from a power source is connected to another same driving circuit, fluctuation of a power voltage also depends on a current to be supplied to this driving circuit.

By contrast with this, during a period in which a voltage is written in the capacitor C1, the driving transistor M1 is disconnected from a power line and is connected to another (first) voltage line 61, so that the resulting power voltage is not influenced by fluctuation.

During a t1−t2 period, a current flowing in a first voltage line is a transient current flowing in the capacitor C1 and becomes small as the time passes, and, at the time t2, little current flows. Hence, even if the first voltage line has a high resistance, fluctuation of the voltage V1 does not actually a problem. Although the current flowing in the first voltage line 61 also flows in the second voltage line 62 through the capacitor C1, the second voltage V2 may not fluctuate for the same reason.

A time subsequent to the time t2 is a period in which a drain current which is determined by V2−V1 flows from the driving transistor M1 to an organic EL element EL, and the organic EL element emits light. Light emission started at t2 ends at a time t7, and a new signal voltage is written in the same driving circuit 100 at a time subsequent to t7.

Hereinafter, the t1−t2 period is referred to as a "first period" or a "writing period", and a t2−t7 period is referred to as a "second period" or a "light emission period".

With the circuit in FIG. 1, the driving transistor M1 is a P channel type MOS transistor, and, upon V2>V1, a drain flows. Although, generally, a signal voltage Vdata which determines luminance of an organic EL element is applied as V2 to the second voltage line 62 and the voltage V1 of the first voltage line is fixed, by contrast with this, the signal voltage Vdata may be applied to the first voltage line 61 and a fixed voltage may be applied to the second voltage line.

Although, when a writing period is sufficiently long, a current flowing in the capacitor C1 from the driving transistor M1 through the first switch SW1 becomes zero, the writing time is actually finite, and the writing period ends before the current becomes zero. In this case, an influence of the voltage held in the capacitor C1 before writing starts (before t1) is left. To prevent this, a period (referred to as a "third period" or an "initialization period") in which the voltage of the capacitor C1 is initialized may be provided prior to t1. The capacitor C1 may be initialized by turning the first switch and the second switch on, flowing the current in a state in which the driving transistor M1 is provided in diode connection and holding in the capacitor C1 a sufficiently high voltage exceeding a threshold voltage of the driving transistor M1. In this case, a stationary current flows in the driving transistor M1, and, preferably, the third and fourth switches are placed in the same state as a state upon light emission and receives a supply of a current from the power line 60.

Initialization may be performed by applying the above high voltage to both ends of the capacitor C1. This will be described in detail in the second embodiment.

The third and fourth switches are switched at the same timing at all timings, and may be controlled by one control line. In the embodiments described below, upon initialization, a source of a driving transistor is connected to a first voltage line and a terminal on an opposite side of a gate of a capacitor is connected to a second voltage line, so that the second switch is also switched at the same timing as those of the third and fourth switches and these control lines may be combined as one.

Hereinafter, the embodiments will be described in detail. Although a light emitting apparatus which uses organic EL elements will be described as an example in the following embodiments, the disclosure is applicable to a light emitting apparatus which uses light emitting elements such as inorganic EL elements, field emission elements or LEDs, and a driving circuit of the light emitting apparatus.

[First Embodiment]

Figure 3:
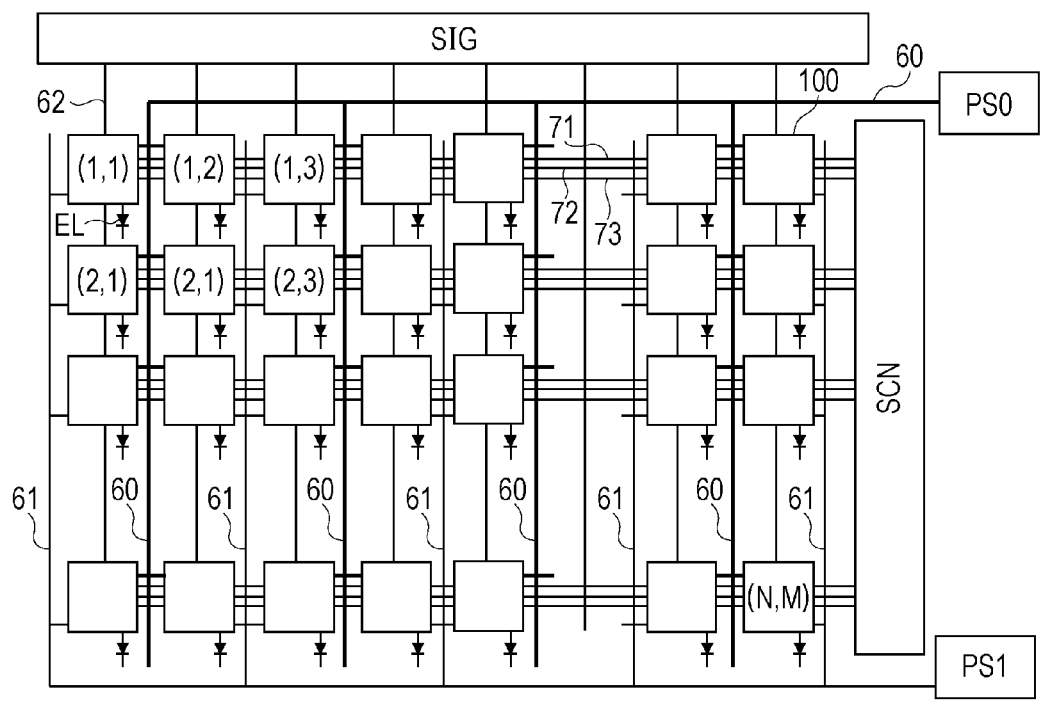
FIG. 3 is a circuit block diagram illustrating a configuration of a display apparatus according to a first embodiment.

FIG. 3 illustrates a display apparatus in which a plurality of organic EL elements EL as light emitting apparatuses according to the first apparatus and driving circuits 100 of the organic EL elements are aligned in a matrix pattern of N rows and M columns. N and M are integers equal to or more than two, and, typically, N=480 and M=640×3 hold.

Three control lines 71, 72 and 73 are provided per row in a row direction, and are given control signals generated by a scanning circuit SCN.

In a column direction crossing the row direction, power lines 60, first voltage lines 61, and second voltage lines 62 are provided. The power lines 60 are arranged every other column, and supplies a power voltage commonly to two columns of driving circuits on both sides. Between columns in which the power lines 60 are provided, the first power lines 61 are arranged every other column, and commonly supplies a first voltage V1 to neighboring driving circuits of two columns. One second voltage line 62 is arranged in each column, and supplies a signal voltage V2=Vdata matching luminance of an organic EL element EL.

The power lines 60 are combined as one outside a pixel matrix, and are connected to a power source PS0. A wiring to commonly connect the power lines 60 per column and to a power source has the same resistance as those of the power lines 60 between columns, and forms part of the power lines. The first voltage lines 61 are also combined as one outside the pixel matrix, and are connected to a power source PS1 of a first voltage V1. The second voltage lines 62 are connected to a signal voltage generating circuit SIG per column.

Figure 4:
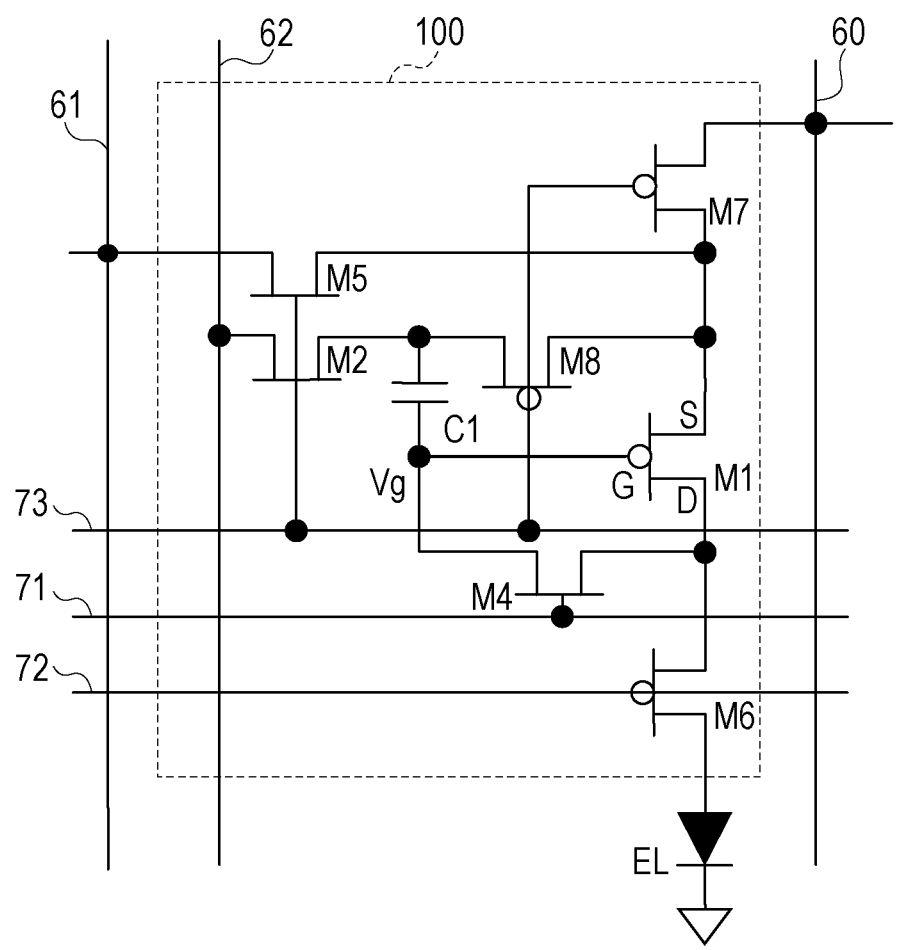
FIG. 4 is a circuit diagram illustrating a configuration of the driving circuit according to the first embodiment.

FIG. 4 is a view illustrating a circuit configuration of each pixel of the display apparatus in FIG. 3. The same portions as those in FIG. 1 will be assigned the same reference numerals.

In the present embodiment, first to fourth switches SW1 to 4 include MOS transistors. The third and fourth switches are both three-terminal and are complementary switches which turn a first terminal and a third terminal off when the first terminal and a second terminal are on and turn the first terminal and the third terminal on when the first terminal and the second terminal off, and may be formed using two complementary MOS transistors a gate of which is common.

The first switch SW1 includes one N channel type MOS transistor M4, and the gate of the first switch SW1 receives a supply of a control signal P1 from the first control line 71. The second switch SW2 includes one P channel type MOS transistor M6, and the gate of the second switch SW2 receives a supply of a control signal P2 from the second control line 72. The third switch includes two transistors of a P channel type MOS transistor M7 between the first terminal and the second terminal and an N channel type MOS transistor M5 between the first terminal and the third terminal. The common gate receives a supply of a control signal P3 from the third control line 73. Similar to the third switch SW3, the fourth switch SW4 includes a P channel type MOS transistor M8 between the first terminal and the second terminal and an N channel type MOS transistor M2 between the first terminal and the third terminal, and the common gate receives a supply of the control signal P3 from the same third control line 73 as that of the third switch.

Figure 5:
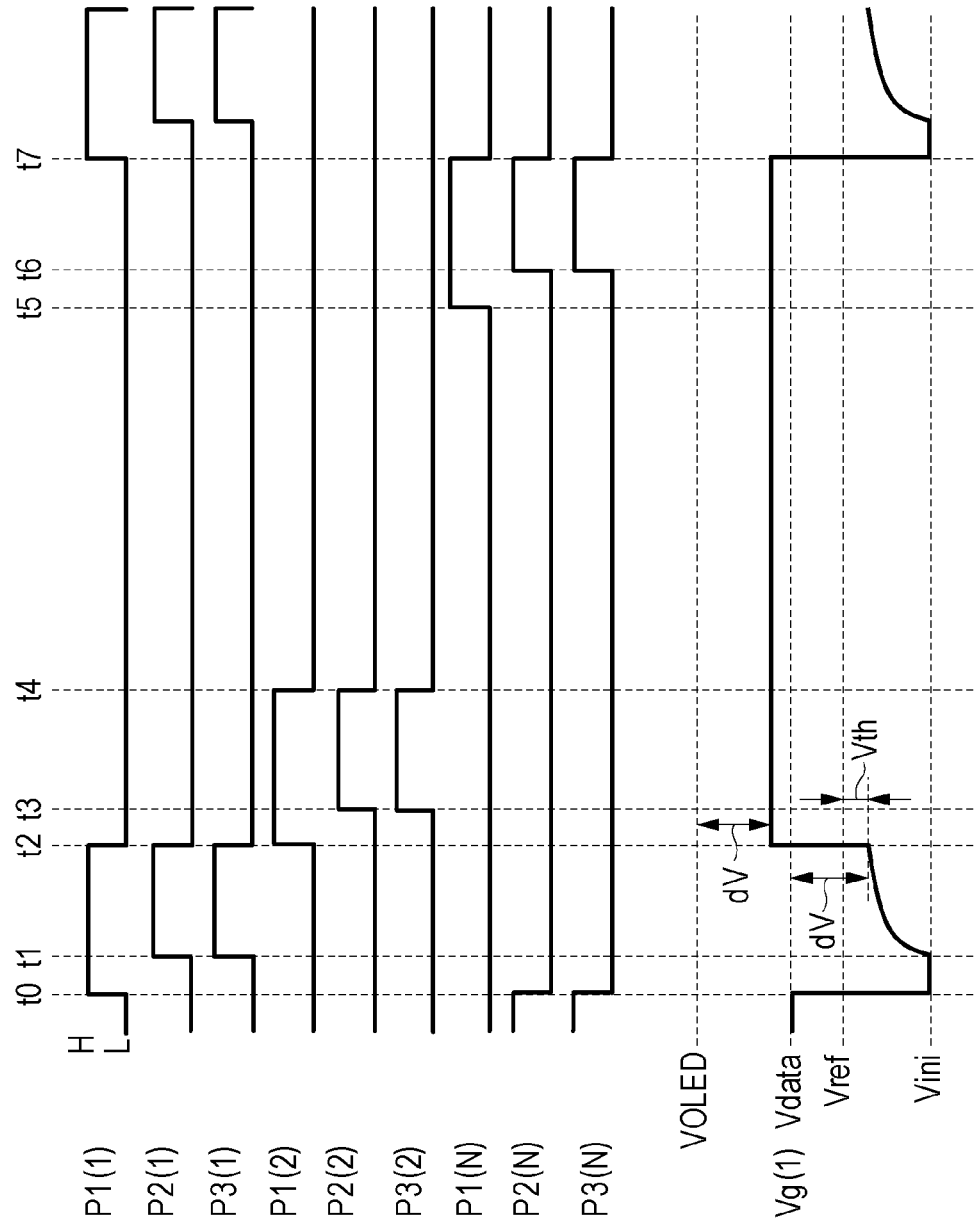
FIG. 5 is a timing chart illustrating operation of the driving circuit according to the first embodiment.

FIG. 5 is a timing chart illustrating the control signals P1, P2 and P3 given to three control lines in each row. Numbers in parentheses after P1, P2 and P3 represent row numbers. Although FIG. 2 illustrates an on/off state of each switch, the control signals P1, P2 and P3 in FIG. 5 are voltage signals, and an upper portion indicates an H (high) level and a lower portion indicates an L (low) level.

A time t0–t1 is an initialization period of the driving circuits 100 in the first row, P1=H, P2=L and P3=L signals are given, and a transistor M4 which is the first switch SW1 and a transistor M6 which is the second switch SW2 are turned on. With the third switch SW3 and the fourth switch SE4, the transistors M7 and M8 on the second terminal side of each switch are turned on, and the transistors M5 and M2 on the third terminal side are off. The gate and the drain of the driving transistor M1 are short-circuited and provided in diode connection, an initialization current flows between the source and the drain, and an on voltage exceeding the threshold voltage Vth is produced in the capacitor C1.

At the time t1–t2, P1=H, P2=H and P3=H hold, the transistor M4 which is the first switch SW1 is kept on and the transistor M6 which is the second switch SW2 is turned off. With the third switch SW3 and the fourth switch SW4, the transistors M5 and M2 on the third terminal side of each switch are turned on, and the transistors M7 and M8 on the second terminal side are off.

In this case, the source S of the driving transistor M1 is connected to the first voltage line 61 and given the first voltage V1, and the terminal of the capacitor C1 on the opposite side of the gate G is connected to the second voltage line 62 and is given the second voltage V2. The first voltage V1 is a fixed reference voltage Vref, and the second voltage V2 is a luminance signal Vdata which determines luminance of an organic EL element.

A current flowing in the source S from the first voltage to the driving transistor M1 in a writing period of the time t1–t2 is outputted from the drain, passes the transistor M4 and flows in one terminal of the capacitor C1. The current flowing from the other terminal of the capacitor C1 passes the second voltage line 62 and flows out. This current produces a voltage Vdata−Vref+Vth at both ends of the capacitor C1 (with a gate side as a negative side) at the time t2.

Control voltages are switched at the time t2, and become P1=L, P2=L and P3=L. The transistor M4 which is the first switch SW1 is turned off, and the transistor M6 which is the second switch SW2 is turned off. With the third switch SW3 and the fourth switch SW4, the second terminal side of each switch is turned on, the terminal on the opposite side of the gate G of the capacitor C1 is connected to the source S of the driving transistor M1, and the source of the driving transistor M1 is connected again to the power line 60.

As a result, a current which is determined according to Vdata−Vref flows from the drain D of the driving transistor M1 to an anode of an organic EL element EL. When Vdata is higher, the current is higher, and an organic EL element emits light at higher luminance. When Vdata=Vref is true, the current is zero, and the organic EL element does not emit light.

Although there is a light emission period of organic EL elements in the first row after the time t2, initialization of driving circuits in the second row simultaneously starts. The voltage V2 of the second voltage line 62 switches to a signal which determines luminance of organic EL elements in the second row. The driving circuits are initialized at t2–t3, and writing is performed at t3–t4.

Hereinafter, initialization and writing are sequentially performed per row, and writing in the final N-th row is finished at t7.

After writing in all rows is finished, writing in the first row is performed again. Thus, initialization and writing of a signal voltage are performed per row during light emission periods of other rows, and all rows have the same durations of the light emission periods.

In the present embodiment, the power lines 60 are provided every other row between columns which are not provided with the first voltage lines 61, and driving circuits of two columns share power lines in the column direction. By this means, it is possible to widen wiring widths of the power lines 60. When the dimension between columns is sufficiently wide, the power line 60 and the first voltage line 61 may be provided one by one in each column.

Signal voltages are written per row, and therefore only one of the driving circuits 100 aligned in one column enters a writing period, and the rest of (N−1) driving circuits are in light emission periods. Hence, in the writing period of a driving circuit in each row, the current flowing toward organic EL elements in the (N−1)th in the light emission period flows toward power lines, and a voltage drops in the power lines 60 along the column direction. During the light emission period, a voltage drop due to a current to organic EL elements in this row additionally occurs. However, during the writing period, a signal is written separately from a power line and a current is determined by a written voltage in the light emission period, so that light emission luminance of organic EL elements EL is not influenced by a voltage drop of the power lines 60.

Although a current also flows to the power line 60 at a portion which bundles the power line 60 of each column and connects to the power source PS0, and then a power voltage of each driving circuit also drops in the row direction, a signal voltage to be written and a current upon light emission are not influenced by any power voltage drop, so that there is no variation of luminance in the row direction.

When the transistor M7 which is on the second terminal side of the third switch has on resistance, this transistor M7 causes a voltage drop, and the voltage of the source S of the driving transistor M1 upon light emission is lower than the voltage Voled of the power line 60. However, as in the present embodiment, when the second terminal 42 of the fourth switch SW4 is connected to the first terminal of the third switch SW3, that is, the source S of the driving transistor M1 though this means the same, a current which is not influenced even by a voltage drop of the transistor M7 is generated.

When on resistance of the transistor M7 is low and this voltage drop may be ignored, the second terminal of the fourth switch second terminal may be connected to the second terminal of the third switch, that is, the power line 60.

[Second Embodiment]

The present example is an example of an exposure apparatus of an electrophotographic printer in which organic EL elements are provided in a one-dimensional array and emitted light irradiates a photosensitive body.

Figure 6:
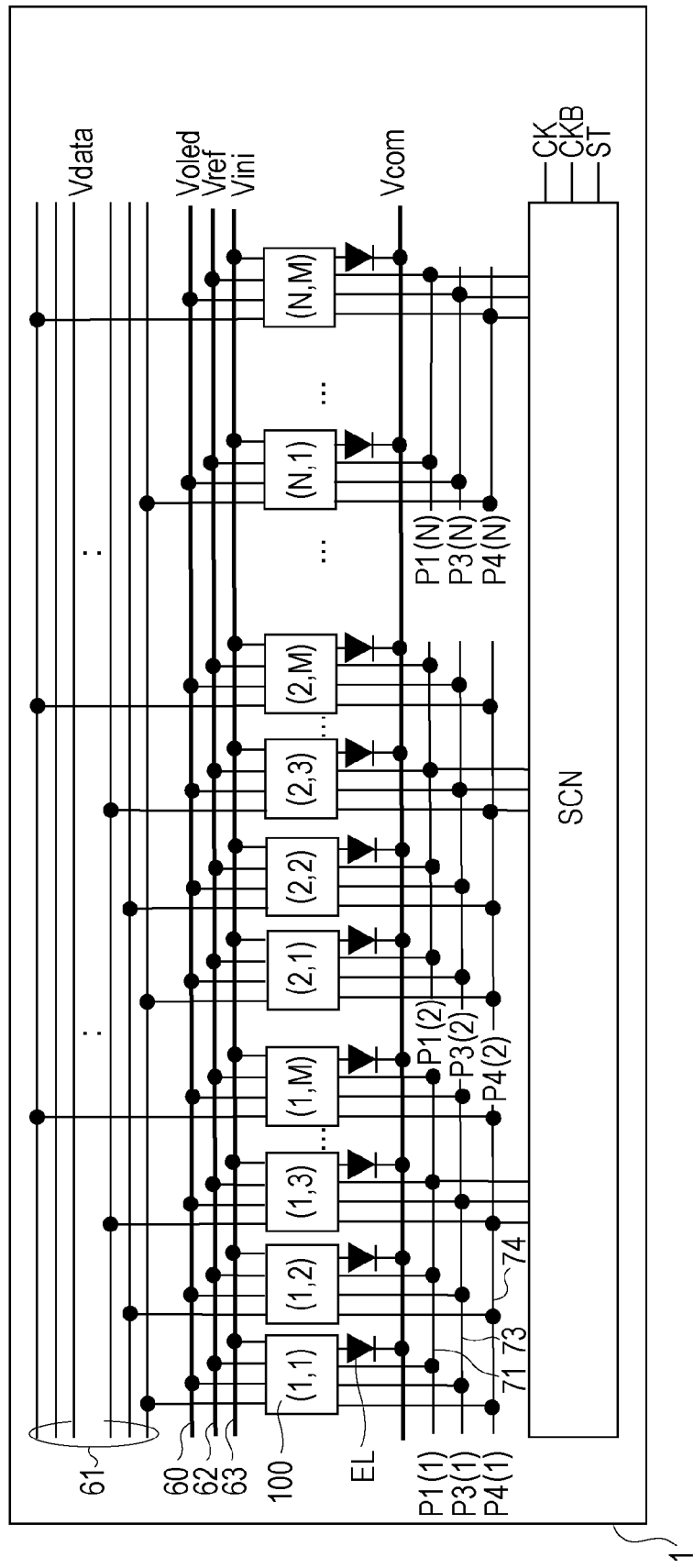
FIG. 6 is a circuit block diagram illustrating a configuration of an exposure apparatus according to a second embodiment.

FIG. 6 is an entire view of an organic EL exposure head which forms a latent image by irradiating a photosensitive drum with light. The same portions as those in FIG. 3 will be assigned the same reference numerals.

On a glass substrate 1, organic EL elements EL are arranged in a line pattern, and a driving circuit 100 is connected to each organic EL element. A power line 60, a second voltage line 62 and a ground line 64 which uses a cathode of an organic EL element as a ground potential Vcom are commonly provided to all organic EL elements and driving circuits along the line. The total number of organic EL elements is 4800 in case of a printer which forms an image of 600 dpi in a lateral direction of an A4 size sheet.

The driving circuits 100 are grouped into N blocks as one block of which includes M driving circuits, and the M driving circuits in a single block are controlled by the common control lines 71, 73 and 74. The number of control lines 71, 73 and 74 are N, and the control lines 71, and 74 may control driving circuits per block. N control lines sequentially select each block and give a control signal to each block. N and M only need to be integers equal to or more than two, and are typically 4800 in total when N=64 and M 75 are true.

Meanwhile, the first voltage line 61 which givens a luminance signal to each driving circuit selects a driving circuit in a block one by one and commonly connects the driving circuit to all blocks.

Although the organic EL elements and the driving circuits in FIG. 6 are aligned in a line pattern and provided in parallel to a control line, a power line and first and second voltage lines, circuit connection is equivalent to a matrix arrangement of N rows and M columns illustrated in FIG. 3. Driving circuits in a block correspond to driving circuits in each row in a matrix display apparatus, and are simultaneously selected and writing is performed simultaneously therein. Driving circuits which belong to different blocks and share the first voltage line correspond to driving circuits in each column in the matrix display apparatus. A reference numeral such as (1, 1) assigned to the driving circuit 100 in FIG. 6 indicates a block number and a position in a block, and corresponds to a row and a column of a display apparatus according to the first embodiment.

Although M and N take any numbers as long as M and N are integers equal to or more than two, when M is increased, a block needs to be scanned at a high speed and, when N is increased, the number of first voltage lines increases and an occupied area increases. M and N preferably take about the same values.

Unlike the first embodiment, the second control line and the third control line are shared as a single control line (referred to as a "third control line 73"). Further, the third voltage line 63 and fourth control lines 74 are provided.

The control lines 71, 73 and 74 are on the opposite side of the power line 60 across the driving circuits 100, and supply control signals P1(n), P3(n) and P4(n) (n is a block number and n=1, 2, . . . , and N is true) per block. On an outer side of the control lines, a scanning circuit SCN which generates these control signals is provided. The scanning circuit SCN receives an input of a block signal CK, an inverted signal CKB and a scan start signal ST from an outside.

The control signals P1, P3 and P4 sequentially select blocks from the first block to the N-th block, and write the signal voltage Vdata in the driving circuits 100 of the selected blocks from the first voltage line 61.

Although the signal voltage Vdata of the second voltage line 62 is inputted from an outside in the present embodiment, a signal voltage generating circuit corresponding to PS3 according to the first embodiment may be made using an integrated circuit and implemented on the substrate 1 according to a COG method.

Figure 7:
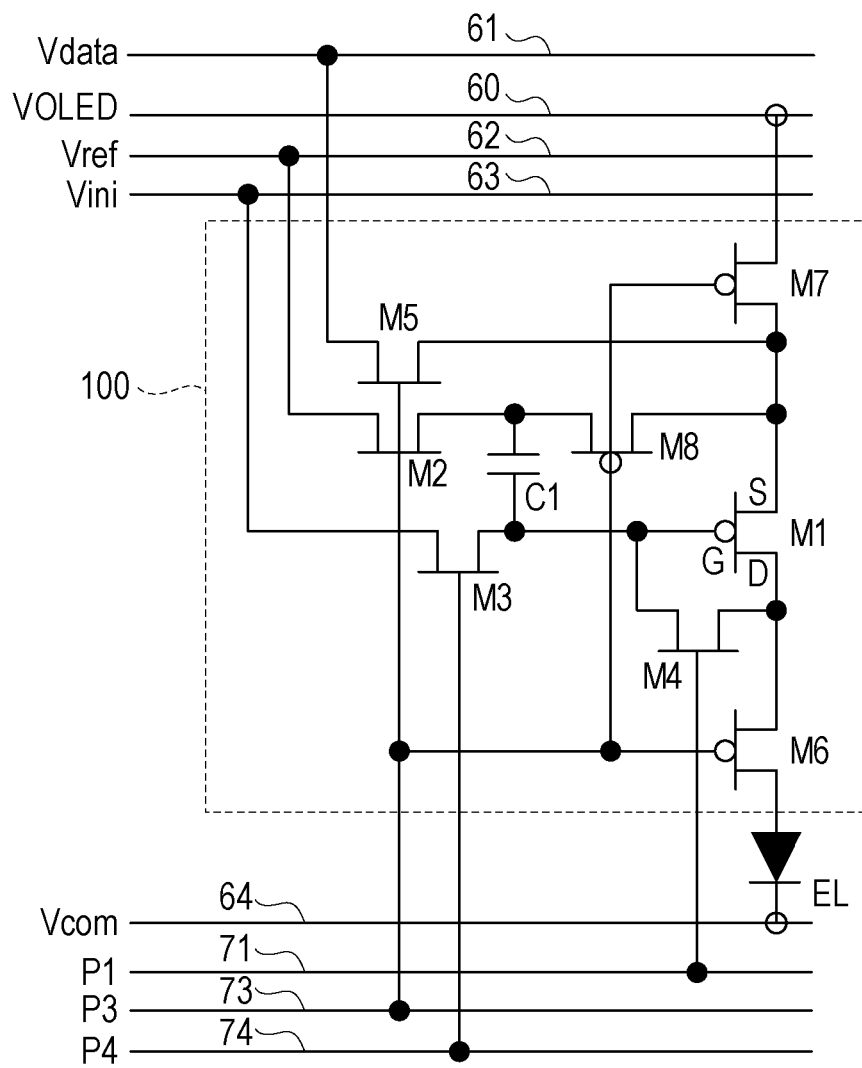
FIG. 7 is a circuit diagram illustrating a configuration of a driving circuit according to the second embodiment.

FIG. 7 is a circuit diagram of the driving circuit 100. The same portions as those in FIG. 4 will be assigned the same reference numeral.

In addition to the driving circuit in FIG. 4, the driving circuit 100 according to the present embodiment has the transistor M3, the third voltage line 63 and the fourth control line 74, and shares the second control line 72 and the third control line 73 as one common control line 73. The transistor M5 which is the second switch has a gate connected to the third control line 73, and is turned on upon P3=L.

The source of the N channel type MOS transistor M3 is connected to the gate of the driving transistor M1, and the drain is connected to the third voltage line 63. The gate is connected to the fourth control line 74, and is turned on when a control signal P4=L is true. The transistor M3 is controlled as the fifth switch to close and open independently from the first to fourth switches.

In the present embodiment, the voltage of the first voltage line 61 is the signal voltage Vdata, and the voltage of the second voltage line 62 is the fixed voltage Vref. Further, a voltage Vini for initialization is applied to the third voltage line 63.

Figure 8:
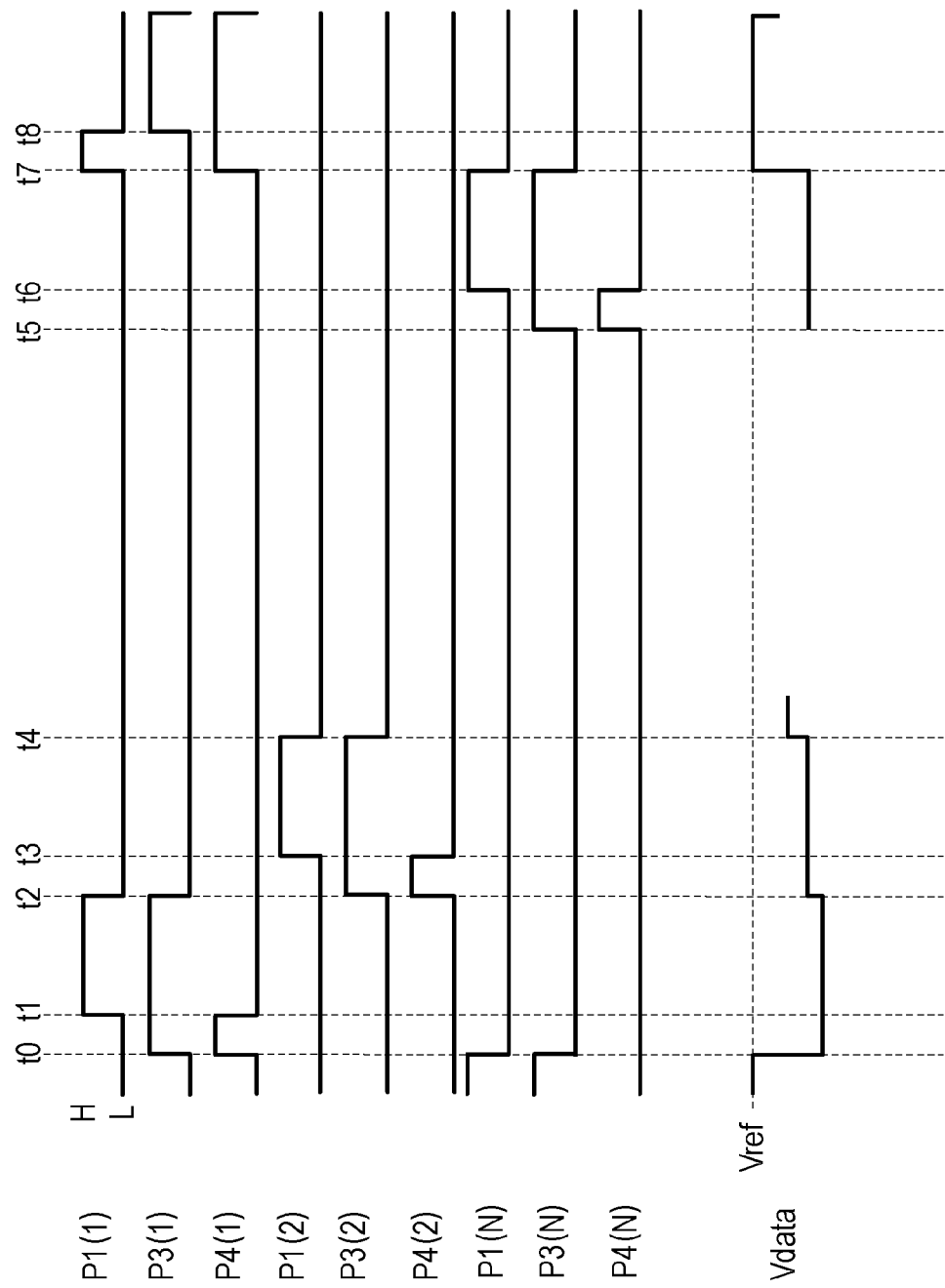
FIG. 8 is a timing chart illustrating operation of the driving circuit according to the second embodiment.

FIG. 8 is a timing chart illustrating operation of a driving circuit in FIG. 7.

At a time t0–t1 which is an initialization period, control signals of the first block become P1(1)=L, P3(1)=H and P4(1)=H.

P1=L holds, so that the transistor M4 which is the first switch SW1 becomes off. P3=H holds, so that the transistor M5 which is the second switch SW2 is turned off, the transistor M5 of the third switch SW on the terminal side is turned on and the transistor M2 of the fourth switch SW4 on the third terminal side is turned on. P4=H holds, so that the transistor M3 which is the fifth switch SW5 also is turned on.

In this case, supply of a current to organic EL elements EL is stopped, the source of the driving transistor M1 is connected to the first voltage line 61 and one end of the holding capacitor C1 is connected to the second voltage line 62. V1=Vdata is set to the source S of the driving transistor M1, and Vini is set to the gate G. The voltage between the gate and the source is Vdata−Vini (with a gate side as a negative side). By setting Vdata to a sufficiently low voltage based on Vini, it is possible to place the driving transistor M1 in a deep on state.

Unlike the first embodiment, a current does not flow to organic EL elements during an initialization period. An organic EL element the luminance of which is zero is continuously in an extinction state at all times, and therefore contrast of brightness is high.

The time t1–t2 is a writing period, and P1(1)=H, P3(1)=H and P4(1)=L hold.

The transistor M4 which is the first switch SW1 is turned on, the transistor M6 which is the second switch SW2 is turned off and the transistor M3 which is fifth switch SW5 is turned off. The same operation as that of the circuit in FIG. 4 according to the first embodiment produces a voltage Vref−Vdata+Vth (with the terminal side connected to the gate of the driving transistor M1 as a negative side) in the capacitor C1.

In a light emission period of the time t2–t7, P1(1)=L, P3(1)=L and P4(1)=L hold. The transistor M4 which is the first switch SW1 is turned off, and Vref—Vdata+Vth produced in the writing period is held at both ends of the capacitor C1. Consequently, the signal voltage Vdata is set to a voltage range lower than Vref, and, when a driving transistor is operated in a saturated region, Vref−Vdata is determined, so that it is possible to flow a current to an organic EL element irrespectively of a power voltage and a threshold voltage.

During a light emission period of the first block at the time T2–t7, the second block is initialized during the period of t2–t3, a signal voltage is written during a period of t3–t4 and light is emitted after t4. Subsequently, initialization, writing and light emission are sequentially performed up to the N-th block per block.

[Third Embodiment]

Figure 9:
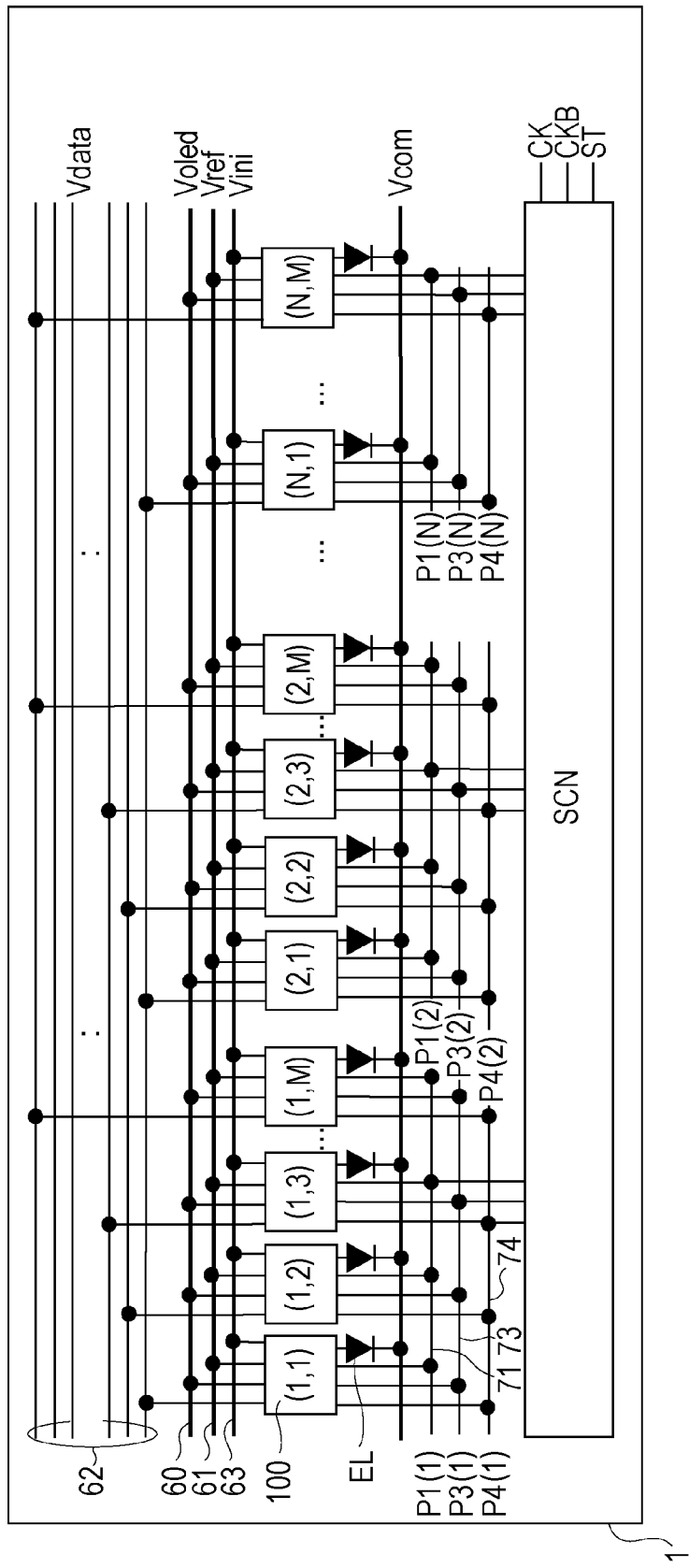
FIG. 9 is a circuit block diagram illustrating a configuration of an exposure apparatus according to a third embodiment.

FIG. 9 is the third example and is an example of an exposure apparatus of the same electrophotographic printer as that in the second embodiment. Differences from the second embodiment are that a first voltage line 61 and a second voltage line 62 are switched, and the fixed voltage Vref is supplied to the first voltage 61 and the signal voltage Vdata which determines luminance is applied to the second voltage line 62 The driving circuit is the same as that in FIG. 7, and timings of control signals P1, P3 and P4 are the same as those in FIG. 8. Meanwhile, unlike FIG. 8, the signal voltage Vdata is set to a voltage range higher than the fixed voltage Vref.

Figure 10A:
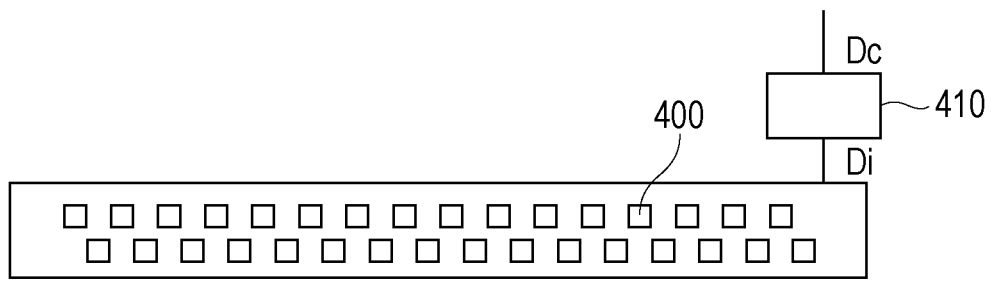
FIGS. 10A and 10B are plan views of the exposure apparatus according to the third embodiment.
Figure 10B:
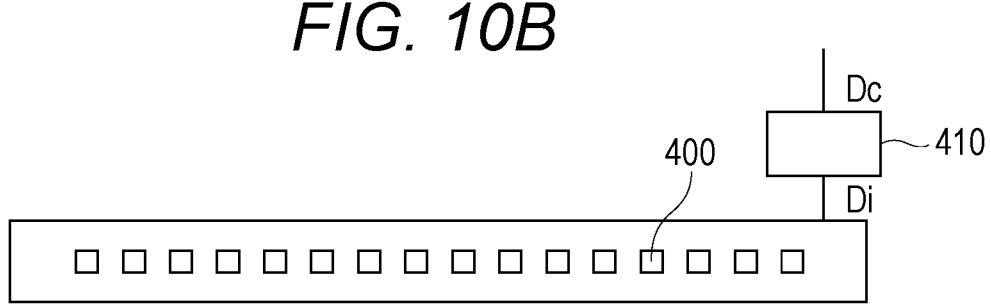

FIGS. 10A and 10B are plan views of an exposure apparatus according to the present embodiment. The exposure apparatus has a plurality of light emitting regions 400 formed by organic EL elements. FIG. 10A is an example where the light emitting areas are provided in a zig-zag pattern, and FIG. 10B is provided in a linear arrangement. When code data Dc is inputted from an external device such as a personal computer to a print controller 410 in FIGS. 10A and 10B, the code data Dc is converted into image data (dot data) Di. This image data Di is inputted to the exposure apparatus, and each light emitting region 400 is controlled based on the image data Di.

Figure 11:
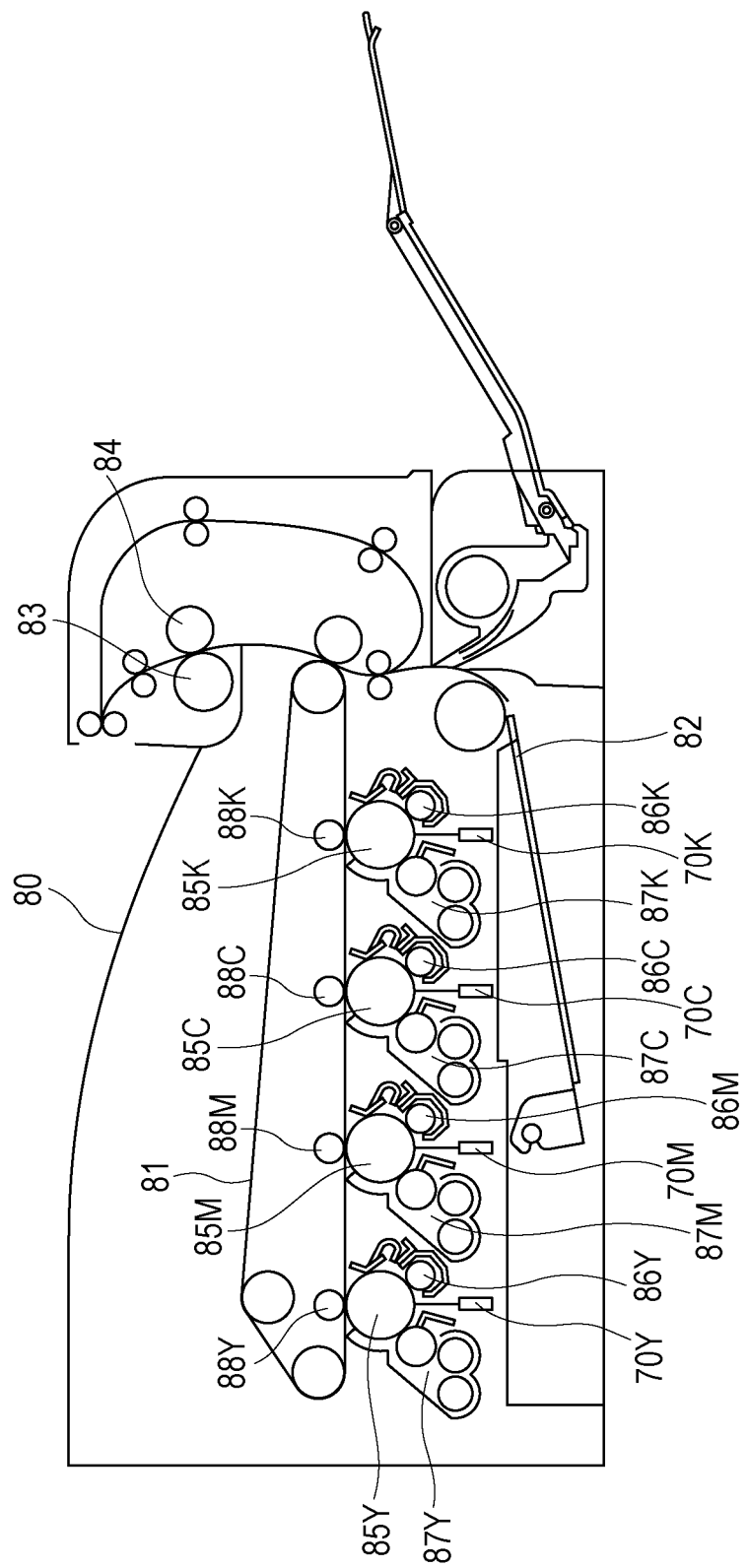
FIG. 11 is a cross-sectional view of an image forming apparatus which uses the exposure apparatus according to the third embodiment.

FIG. 11 is a cross-sectional view of an electrophotographic printer which has an exposure apparatus according to the present embodiment. An image forming apparatus represented by an electrophotographic printer has an exposure apparatus and a photosensitive body on a surface of which a latent image is formed by the exposure apparatus. The exposure apparatus adopts a method of scanning a laser beam and fixed exposure method where light emitting elements arranged in an array pattern as in the present embodiment.

An image forming apparatus may selectively execute a color mode of forming a color image by overlaying four color toners of yellow (Y), magenta (M), cyan (C) and black (K), and a monochrome mode of forming a monochrome image using only black (K) toner.

An exposure unit 70Y has an exposure apparatus according to the present embodiment, and a lens which collects light emitted from the exposure apparatus and irradiates a surface of a photosensitive drum 85Y with exposure light. Further, the exposure unit 70Y may have an optical absorption member which prevents a position other than a predetermined position of the surface of the photosensitive drum 85Y from being irradiated with light.

In a housing 80 of the image forming apparatus, in addition to exposure units 70Y, 70M, 70C and 70K, a transfer belt 81, a feeding unit 82, a fusing roller 83 and a pressure roller 84 are arranged. Further, in the housing 80, photosensitive drums 85Y, 85M, 85C and 85K, charging rollers 86Y, 86M, 86C and 86K, developer 87Y, 87M, 87C and 87K and transfer rollers 88Y, 88M, 88C and 88K are arranged. The feeding unit 82 is formed detachably.

Image forming operation is as follows. In addition, although a case will be described a yellow (Y) image is formed as a latent image, a sheet is conveyed by the transfer belt 81, and magenta (M), cyan (C) and black (K) images are sequentially formed in the same way as the way the yellow (Y) image is formed.

First, based on a signal from a print controller, the photosensitive drum 85Y which is an electrostatic latent image carrier is rotated clockwise by a motor (not illustrated). Further, following this rotation, a photosensitive surface of the photosensitive drum 85Y rotates in response to exposure light. Above the photosensitive drum 85Y, the charging roller 86Y which charges the surface of the photosensitive drum 85Y with a predetermined pattern is provided to abut the surface. Further, the surface of the photosensitive drum 85Y uniformly charged by the charging roller 86Y is irradiated with exposure light by the exposure unit 70Y.

An irradiation position, an irradiation timing, an irradiation time and an irradiation intensity of exposure light emitted from the exposure unit 70Y are adjusted based on the image data Di, and an electrostatic image is formed on the surface of the photosensitive drum 85Y by exposure light. This electrostatic latent image is developed as a toner image by the developer 87Y disposed to abut on the photosensitive drum 85Y on a side closer to a downstream of a rotation direction of the photosensitive drum 85Y than the irradiation position of exposure light.

The toner image developed by the developer 87Y is transferred onto a sheet which is a material to be transferred, by the transfer roller 88Y disposed to oppose to the photosensitive drum 85Y below the photosensitive drum 85Y. Although a sheet is accommodated in a sheet cassette in the feeding unit 82, sheets may be fed by a manual tray. At an end of the sheet cassette, feeding rollers are disposed and convey sheets in the sheet cassette to a conveying path.

As described above, a sheet to which a toner image is transferred is conveyed to a fuser by the transfer belt 81. The fuser includes a fusing roller 83 which has a fusing heater (not illustrated) inside and the pressuring roller 84 which is disposed to pressure against this fusing roller 83. A conveyed sheet is pressured and heated by the fusing roller 83 and the pressuring roller 84, so that a toner image is fused on a sheet.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2012-206884, filed 2012Sep. 20, which is hereby incorporated by reference herein in its entirety.

What is claimed is:

1. A light emitting apparatus comprising:
   a light emitting element;
   a driving circuit including a driving transistor, a first switch provided between a gate and a drain of the driving transistor, a second switch provided between the drain of the driving transistor and one end of the light emitting element and a capacitor one end of which is connected to the gate of the driving transistor;
   a power line configured to supply a power source voltage to the driving circuit; and
   a first voltage line and a second voltage line configured to supply a first voltage and a second voltage, respectively, to the driving circuit, wherein
   the driving circuit includes a third switch which connects a source of the driving transistor to the power line and the first voltage line alternately, and a fourth switch which connects the other end of the capacitor to the source of the driving transistor and the second voltage line alternately, and
   the first to fourth switches are controlled such that,
   in a first period in which the first switch is on and the second switch is off, the third switch connects the source of the driving transistor to the first voltage line and the fourth switch connects the other end of the capacitor to the second voltage line, and
   in a second period in which the first switch is off and the second switch is on, the third switch connects the source of the driving transistor to the power line and the fourth switch connects the other end of the capacitor to the source of the driving transistor.

2. The light emitting apparatus according to claim 1, wherein
   a plurality of the driving circuits are arranged along the power line to share the power line,
   the first to fourth switches of each of the driving circuits are controlled independently of the other driving circuits, and
   during one of the driving circuits is in the first period, a rest of the driving circuits are in the second period.

3. The light emitting apparatus according to claim 1, further comprising N blocks of M driving circuits (M and N are integers equal to or more than two) arranged in a row along the power line to share the power line, the first to fourth switches of the driving circuits in a block are controlled independently of the driving circuits in the other blocks, and
   during M driving circuits in a block are in the first period, M×(N−1) driving circuits of a rest of blocks are in the second period.

4. The light emitting apparatus according to claim 1, wherein the first power line supplies a fixed voltage to the driving circuit, and the second power line supplies a voltage which determines luminance of the light emitting element to the driving circuit.

5. The light emitting apparatus according to claim 1, wherein the second voltage line supplies a fixed voltage to the driving circuit, and the first voltage line supplies a voltage which determines luminance of the light emitting element to the driving circuit.

6. The light emitting apparatus according to claim 1, wherein the third switch and the fourth switch are controlled by an identical control signal.

7. The light emitting apparatus according to claim 1, wherein the second switch, the third switch, and the fourth switch are controlled by an identical control signal.

8. The light emitting apparatus according to claim 1, wherein the third switch includes a P-MOS transistor and an N-MOS transistor gates of which are connected.

9. The light emitting apparatus according to claim 1, wherein the fourth switch includes a P-MOS transistor and an N-MOS transistor gates of which are connected.

10. The light emitting apparatus according to claim 1, wherein
    the driving circuit includes a fifth switch provided between the gate of the driving transistor and a third voltage line, and
    in a third period in which the first switch and the second switch are both off, the third switch connects the source of the driving transistor to the first voltage line and the fourth switch connects the other end of the capacitor to the second voltage line, the fifth switch is controlled to be on.

11. A plurality of driving circuits aligned along a common power line and individually supplying a current to a light emitting element, each of the driving circuits comprising:
    a driving transistor;
    a capacitor one end of which is connected to a gate of the driving transistor;
    a first switch connecting the gate of the driving transistor to a drain of the driving transistor;
    a second switch connecting the drain of the driving transistor to the light emitting element;
    a third switch connecting a source of the driving transistor to the power line and a first voltage line alternately;
    a fourth switch connecting the other end of the capacitor to the source of the driving transistor and the second voltage line alternately; and
    at least one control line configured to control the first to fourth switches.

12. The driving circuit of a light emitting element according to claim 11, wherein the control line is provided to intersect the power line.

13. The driving circuit of a light emitting element according to claim 11, wherein N blocks of M (M and N are integers equal to or more than two) driving circuits are aligned along the power line, and N control lines which individually control the M driving circuits in a block are provided in parallel to the power line.

14. A method of driving a light emitting element using a driving circuit connected to a power line, a first voltage line, and a second voltage line, wherein the driving circuit includes: a driving transistor; a capacitor one end of which is connected to a gate of the driving transistor; a first switch connecting the gate of the driving transistor to a drain of the driving transistor; a second switch connecting the drain of the driving transistor to the light emitting element; a third switch connecting a source of the driving transistor to the power line and the first voltage line alternately; and a fourth switch connecting the other end of the capacitor to the source of the driving transistor and the second voltage line alternately, the method comprising:

turning on the first switch, turning off the second switch, connecting the source of the driving transistor to the first voltage line by means of the third switch and connecting the other end of the capacitor to the second voltage line by means of the fourth switch; and turning off the first switch, turning on the second switch, connecting the source of the driving transistor to the power line by means of the third switch and connecting the other end of the capacitor to the source of the driving transistor by means of the fourth switch.

15. The method of driving a light emitting element according to claim 14, wherein the driving circuit includes a fifth switch provided between the gate of the driving transistor and a third voltage line, the method further comprising:

turning off the first switch and the second switch, connecting the source of the driving transistor to the first voltage line by means of the third switch, connecting the other end of the capacitor to the second voltage line by means of the fourth switch and turning on the fifth switch.

16. A display device comprising the light emitting apparatus according to claim 1.

17. An image forming apparatus comprising: an exposure apparatus including the light emitting apparatus according to claim 1; and a photosensitive body.

* * * * *